No. 609,184. Patented Aug. 16, 1898.
I. FRANK.
ANIMAL TRAP.
(Application filed Mar. 21, 1898.)
(No Model.)

Witnesses
James S. Smith
Jacobson

Inventor
Isaac Frank
by Simon Lyon
Attorney

UNITED STATES PATENT OFFICE.

ISAAC FRANK, OF CINCINNATI, OHIO.

ANIMAL-TRAP.

SPECIFICATION forming part of Letters Patent No. 609,184, dated August 16, 1898.

Application filed March 21, 1898. Serial No. 674,638. (No model.)

*To all whom it may concern:*

Be it known that I, ISAAC FRANK, a citizen of the United States, residing at Cincinnati, in the county of Hamilton and State of Ohio, have invented certain new and useful Improvements in Animal-Traps; and I do hereby declare the following to be a full, clear, and exact description of the invention, reference being had to the accompanying drawings, forming a part of this specification, wherein like letters of reference indicate similar parts in each figure of said drawings.

The object of my invention is to provide means for entrapping rodents and other animals by enticing them to a food-bait and then, while passing onward toward said bait, causing them to be ejected downward through a chute into a tank containing fluid. After any animal is caused to be thrown down into the tank by opening of spring-controlled covers said covers will immediately return to their normal closing positions, all as hereinafter specifically set forth.

Figure 1:
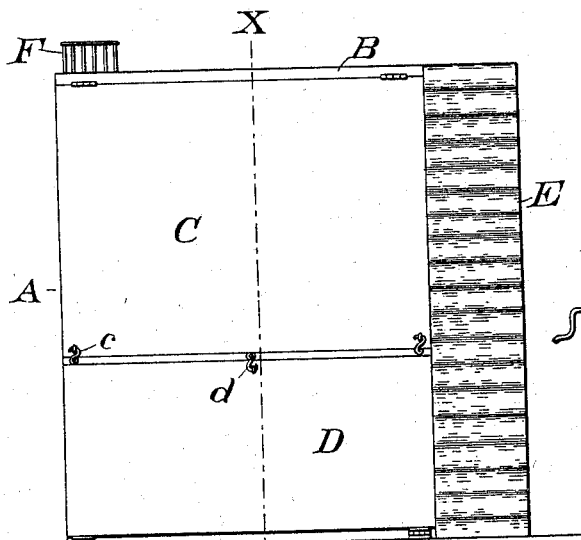
Figure 2:
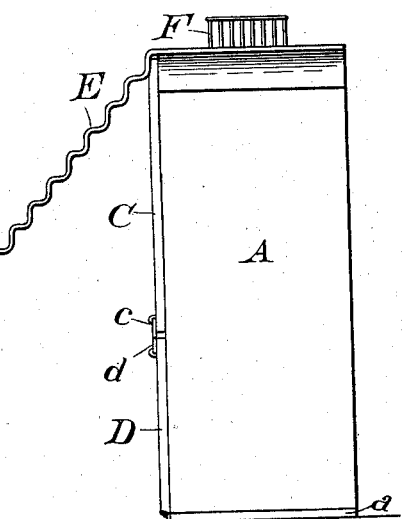
Figure 3:
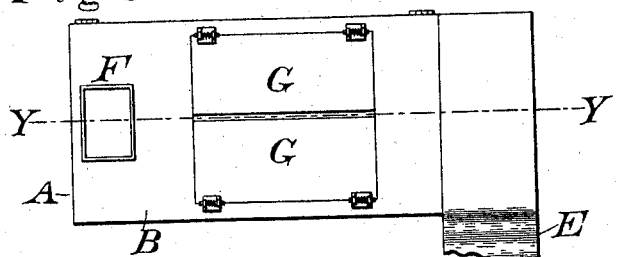
Figure 4:
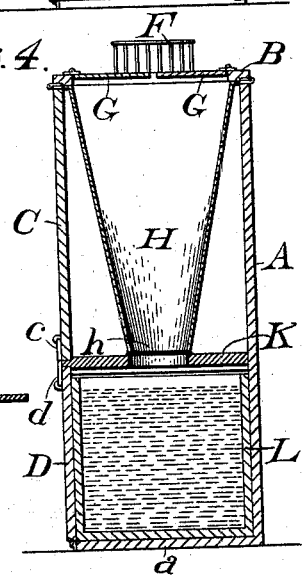
Figure 5:
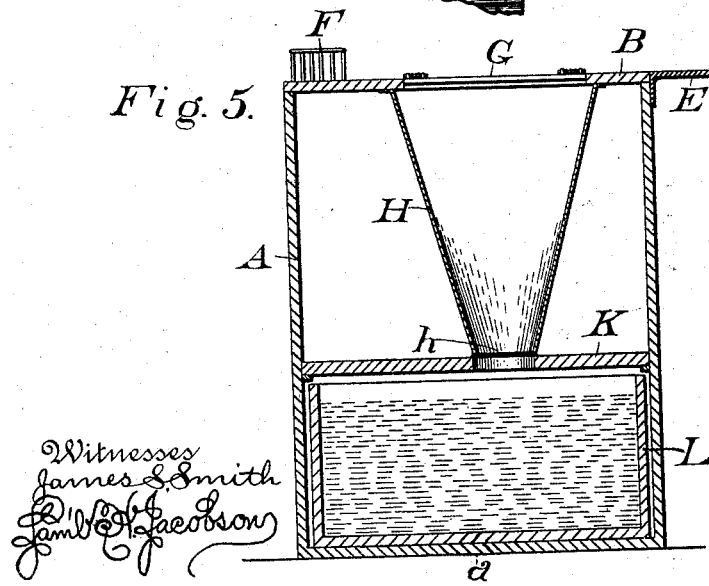

In the drawings, Figure 1 is a front elevation of the device closed up. Fig. 2 is a side elevation thereof. Fig. 3 is a top plan view. Fig. 4 is a sectional view on line $x$ $x$ of Fig. 1. Fig. 5 is a sectional view on line $y$ $y$ of Fig. 3.

A is the trap proper, provided with attachments constructed in accordance with my invention. $a$ is the bottom thereof; B, top of the trap.

C is hinged upper section of front of the trap.

D is hinged lower section of front, below the hinged section C; E, an inclined end or passage-way, shown as corrugated; but it may be roughened in any suitable manner to prevent the animal when walking upwardly from slipping down, as the inclined passage-way constructed as set forth will have a surface that will provide perfect foothold.

F is the bait-crib, which is located at roof of the trap on side thereof opposite to the upper end of the inclined passage-way E.

G represents top doors fastened to opposite upper ends of sides of the main trap, said doors meeting at median point of top of the trap, each of said doors being connected to upper part of the trap by spring-hinges, that will allow them to be turned downwardly and immediately restore them into closed position when relieved from pressure.

H represents a chute extending downwardly until it reaches partition that divides the trap into sections. Said chute is quadrangular at its upper end, which is open and located directly under the top doors, allowing said doors to turn downwardly within said chute when they are subjected to weight-pressure and to freely return upwardly in closed position, as hereinafter set forth. The chute extends downwardly, having inclined sides, and is open at its lower end, as fully illustrated in the drawings.

K is a partition dividing the trap into sections, having a central opening around which lower open end $h$ of the chute is fastened, allowing an entrapped animal to pass therethrough downwardly.

L represents a tank which in carrying out my invention is supplied with fluid of any desired character, but preferably with suitable chemicals that will asphyxiate or otherwise affect the animal ejected into said tank through the chute. The tank fits into the lower section of the trap under the partition K, resting on the bottom $a$, and can be removed therefrom and replaced, as desired. It is held closed in position by means of door D, which is provided with cleats or any suitable mechanical device for holding said door securely against the removable fluid-tank. The upper door C is provided with suitable means to enable it to be opened and securely closed. Fastening-hooks are shown at $c$ and $d$ in the drawings; but any suitable locking devices may be employed without departing from the scope of my invention.

The removable fluid-tank is made of galvanized zinc or granite and of size to reach upwardly near the partition K. The chute is also made of similar material, and the partition and other parts of the trap made of wood are covered with metal.

From the foregoing description, in connection with the drawings, the nature and practical operation of my invention will be readily understood.

The animal, being tempted by strong-flavored bait in the bait-crib to climb up the inclined passage-way, crosses the top of the trap, and while on the way to the bait-crib must necessarily step upon the spring-controlled hinged top doors G, which will immediately be forced downward, and the animal will be ejected through the chute into the tank filled with fluid and be there retained until said tank is removed. As soon as said hinged top doors are relieved from weight of the animal they will spring back to their closed position, and the device will be in condition to entrap other animals that may be enticed to ascend the passage-way, as it will be readily understood that the bait cannot be reached by any one of them, and it will always remain in its normal condition.

Having thus fully described my invention, what I claim, and desire to secure by Letters Patent of the United States of America, is—

An animal-trap having at one of its sides an inclined passage-way with its upper surface roughened, the trap having a horizontal partition dividing it interiorly into two sections, each of said sections provided with a door at the front of the trap-chamber that can be separately opened, the upper part of the trap having spring-hinged doors opening into a chute having inclined sides reaching downwardly to the horizontal partition dividing the body of the trap into sections, said partition having an opening coincident in size and shape with the lower open end of the chute all in combination with a removable fluid-tank inclosed within lower section of the main structure and a flavored-bait crib at the top of the trap at opposite side of main entrance thereto, substantially as described.

ISAAC FRANK.

Witnesses:
FRANK ALTENAU,
FRANK GUNETORONOM.